United States Patent
Brown et al.

(10) Patent No.: US 6,397,287 B1
(45) Date of Patent: May 28, 2002

(54) METHOD AND APPARATUS FOR DYNAMIC BUS REQUEST AND BURST-LENGTH CONTROL

(75) Inventors: David Robert Brown, San Jose; Glenn W. Connery, Sunnyvale, both of CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/238,238

(22) Filed: Jan. 27, 1999

(51) Int. Cl.[7] ............................................. G06F 13/00
(52) U.S. Cl. ...................... 710/305; 710/52; 710/57; 710/58; 710/310; 709/250
(58) Field of Search ......................... 710/52, 57, 58, 710/305, 310; 709/250

(56) References Cited

U.S. PATENT DOCUMENTS 5,249,292 A * 9/1993 Chiappa ..................... 370/392
5,684,826 A * 11/1997 Ratner .................... 340/310.01

* cited by examiner

*Primary Examiner*—Xuan M. Thai
(74) *Attorney, Agent, or Firm*—McDonnell Boehnen Hulbert & Berghoff

(57) ABSTRACT

A network adapter is provided that controls the transfer of data between a host computer and a network medium in a manner which optimizes the amount of data transferred between the host computer and the buffer of the network adapter during a contemporaneous transfer of data between the network medium and the buffer. The network adapter optimizes the data transfer by dynamically determining when to make a bus request such that the buffer is capable of transferring a data packet of a particular target burst size at the end of an estimated latency period. The network adapter includes a buffer memory that transfers data between the host computer and the network medium and a buffer control logic that generates a first buffer data signal in response to the amount of data in the buffer memory. The adapter further includes a bus control logic that generates a second buffer data signal in response to previous transfers of data between the host computer and the network medium, and a dynamic bus request logic that asserts a bus request signal at a time responsive to the first and second buffer data signals to initiate an optimized data transfer between the host computer and the buffer memory during a contemporaneous transfer of data between the buffer memory and the network medium. In one instance, the target burst size is equal to the maximum amount of data transferred between the host computer and the buffer in a single transaction since the host computer has been powered on. Further, in one instance the estimated latency is set as the latency of the previous data transfer between the buffer and the host computer.

90 Claims, 7 Drawing Sheets

METHOD AND APPARATUS FOR DYNAMIC BUS REQUEST AND BURST-LENGTH CONTROL

1. BACKGROUND OF THE INVENTION a. Field of the Invention

The present invention relates to architectures of network adapters. In particular, the present invention relates to architectures which optimize the transmission of packets or frames of data across a communication network.

b. Description of Related Art

In a communications network such as a LAN or a WAN, a network adapter manages the transmission and reception of data packets by transferring data between the network and a host computer system memory. The system memory is used by several different devices including the system CPU, Input/Output devices and storage devices as well as the network itself. The network adapter typically accesses the system memory through a shared host system expansion bus, such as a PCI bus.

Network adapters therefore play a key role in the efficiency of the transfer of data between a computer system and a network. Typically, a network adapter transmits data onto a network from a host computer by reading the data out of the host system memory, through a host bridge device, across the expansion bus, into a transmit buffer in the network adapter and then out to the network. This process of moving data from system memory to the adapter transmit buffer can be referred to as a "download". Similarly, data received from the network enters a receive buffer in the network adapter, and from there is moved across the expansion bus, through the host bridge and into system memory buffers. This process can be referred to as an "upload".

Given the ever increasing demands on computer systems and networks to operate more quickly and efficiently, it has become paramount that network adapters optimize the time during which they have control of an expansion bus to perform uploads and downloads.

One method of optimizing the bus tenure is to maximize burst length. For, in a typical computer system, data bytes are moved across the expansion bus and to the network in groups called bursts. A burst is defined as the number of bytes which can be moved across the expansion bus within the adapter's tenure on the bus. The burst length is determined by the adapter design, the host bridge design, and the instantaneous demand for the expansion bus. In general, it is optimal if larger bursts are utilized because they increase the efficiency of the expansion bus and, in a high demand environment, allow greater data throughput for each device and for the system as a whole. Typically, the size of these bursts is limited physically by several of the aforementioned devices. First, the particular host bridge implementation will possess a maximum burst length capability, related to the size of its internal buffering and to its internal architecture. Second, the internal buffering of the network adapter itself will similarly limit the maximum burst length capability. Generally speaking, the internal buffering of the network adapter is usually smaller than that of the typical host bridge implementation, and thus the maximum burst length is usually thereby limited. For instance, in a cut-through network adapter, a data packet is copied through the adapter into the shared memory. In order to accomplish this, the adapter buffers the data in a first-in, first-out queue (FIFO) in the adapter. A typical FIFO may, for example, be 128 to 1024 bytes while data packets may be as large as 4500 bytes. This is true because of a desire to minimize the costs of network adapters—which are typically implemented by application specific integrated circuits (ASICS)—by limiting the amount of memory available for the internal transmit and receive buffers.

Beyond maximizing burst length, another way of optimizing network data throughput is to transmit data onto the network while simultaneously moving the data from system memory across the expansion bus. This also allows the adapter to implement smaller transmit and receive buffers, since there does not need to be a large enough buffer to hold an entire maximum-sized network data packet as discussed above. However, having buffers smaller than a packet introduces the problem of transmit underruns and receive overruns.

A transmit underrun can occur if an adapter is transmitting a packet on to the network, out of its buffer, while simultaneously moving that packet from system memory into its transmit buffer. If the adapter experiences a momentary interruption in the flow of data from system memory, the transmit buffer can go empty, resulting in incorrect data being transmitted to the network. Similarly, a receive overrun occurs if an adapter is receiving a packet from the network, and it is temporarily unable to move the data at sufficient speed across the expansion bus into system memory. Eventually, the receive buffer fills up, and any subsequent data from the network is lost. Both transmit underruns and receive overruns result in degraded performance in the network, and are to be avoided.

Therefore, what is needed is a method and an apparatus which further optimizes the transfer of data between a host computer system and a network without needlessly increasing the size, and cost, of network adapter buffers, and without subjecting the system to performance degrading data overruns and underruns.

2. SUMMARY OF THE INVENTION

As discussed above, the optimization of data transfer between a host system and a network is an important factor in the design of computer networks such as local area networks (LAN) and wide area networks (WAN). The optimization of data transfer may include maximizing the amount of data transferred to/from the host system during a particular bus tenure while simultaneously minimizing the number of underruns and overruns in the system. As will be set out below in further detail, the present invention includes a method and apparatus for optimizing the transfer of data between a host computer system and a network without needlessly increasing the size, and cost, of network adapter buffers, and without subjecting the system to performance degrading data overruns and underruns.

In one embodiment, the present invention is characterized as a method for transferring data between a host computer and a network medium coupled to the host computer—the host computer includes an expansion bus and a network adapter device coupled to the expansion bus and to the network medium. In this embodiment, the method includes transferring data between a buffer memory in the network adapter and the network medium, and generating a first buffer data signal in response to the amount of data present in the buffer memory. The method further includes generating a second buffer data signal in response to the length of previous transfers of data between the host computer and the network medium. Accordingly, the second buffer data signal represents the amount of data in the buffer at the time when the expansion bus should be requested by the network adapter device to optimize a data transfer between the network adapter and the host computer. The method also includes the steps of asserting a bus request signal to the host computer in response to the first and second buffer data signals and finally transferring data between the host computer and the buffer memory over the expansion bus.

In one instance of this embodiment, the step of asserting the bus request signal comprises providing the first and second buffer data signals to a dynamic bus request control logic, comparing the first buffer data signal with the second buffer data signal, and generating the bus request signal when the value of the first buffer data signal satisfies a logical relation to, such as is one of greater than and less than, the second buffer data signal.

In still another embodiment, the method is further defined in that generating the second buffer data signal is responsive to the size of data bursts transferred between the host computer and the buffer memory. In one instance of this embodiment, generating the second buffer data signal includes monitoring the size of each data burst transferred between the host computer and the buffer memory and updating the value of the second buffer data signal such that the second buffer data signal comprises a value representative of the size of the maximum sized data burst transferred between the host computer and the buffer memory since the host computer was powered on.

In one instance of this embodiment, the step of asserting the bus request signal comprises providing the first and second buffer data signals to a dynamic bus request control logic. The dynamic bus request control logic compares the first buffer data signal with the second buffer data signal and generates the bus request signal when the value of the first buffer data signal satisfies a logic relation to the second buffer data signal.

In still another embodiment of the basic method, the step of generating the second buffer data signal is responsive to an estimated latency signal. In one instance of this embodiment the second buffer data signal comprises the difference of the estimated latency signal and an optimal packet length signal. The optimal burst length signal represents the length of a piece of data which will optimize an individual data transfer between the host computer and the buffer memory. In one instance, the estimated latency signal comprises an estimate of the amount of data transfer that would occur between the host memory and the buffer memory during a time period comprising the result of a function of latency times of one or more previous transfers, such as the latency time of the immediately previous data transfer between the host memory and the buffer memory, an average latency time of a plurality of previous transfers, or a function of latency time of previous transfers having a particular characteristic.

In a farther instance, the step of generating the optimal burst length signal comprises monitoring the size of each data burst transferred between the host computer and the buffer memory and updating the value of the optimal burst length signal such that the optimal burst length signal comprises a value representative of the size of the maximum sized data packet transferred between the host computer and the buffer memory since the host computer was powered on. This embodiment is further described in another instance in which the step of asserting the bus request signal comprises providing the first and second buffer data signals to a dynamic bus request control logic. As above, the dynamic bus request control logic compares the first buffer data signal with the second buffer data signal and generates the bus request signal when the value of the first buffer data signal satisfies a logic relation to the value of the second buffer data signal.

The above described method embodiments of the invention may be further described by the step of providing a priority threshold signal and asserting the bus request signal when the value of the first buffer data signal satisfies a logic relation to the priority threshold signal. In one instance the priority threshold signal comprises a signal generated in response to previous transfers of data between the host computer and the network medium. In a still further description of the above embodiments, the buffer memory comprises a memory that is smaller than the maximum size data packet utilized in the communication system.

The invention as summarized above with respect to a method may be alternatively characterized as a network adapter apparatus for controlling the transfer of data between a host computer and a network medium. In one embodiment, the apparatus is described as a device including a means to perform each of the aforementioned method steps.

In another embodiment the apparatus is described as a network adapter apparatus comprising a buffer memory that transfers data between the host computer and the network medium and a buffer control logic that generates a first buffer data signal in response to the amount of data in the buffer memory. Also included is a bus control logic that generates a second buffer data signal in response to previous transfers of data between the host computer and the network medium and a dynamic bus request logic that asserts a bus request signal at a time responsive to the first and second buffer data signals to initiate an optimized data transfer between the host computer and the buffer memory during a contemporaneous transfer of data between the buffer memory and the network medium. In one instance, the dynamic bus request logic asserts the bus request signal when the value of the first buffer data signal satisfies a logic relation to the value of the second buffer data signal.

In another embodiment of the network adapter the bus control logic further comprises a target burst logic that generates the second buffer data signal in response to the size of data bursts transferred between the host computer and the buffer memory. In one instance, the target burst logic comprises monitor logic that monitors the size of each data burst transferred between the host computer and the buffer memory and a first compare logic that updates the value of the second buffer data signal such that the second buffer data signal comprises a value representative of the size of previous bursts based on a statistical function, such as the maximum sized data packet transferred between the host computer and the buffer memory since the host computer was powered on, or alternatively a data packet of practical size, based on statistically filtering out anomalous packet sizes and selecting a practical maximum of the result. In one case, the dynamic bus request logic asserts the bus request signal when the value of the first buffer data signal satisfies a logic relation to the value of the second buffer data signal.

In still another embodiment, the bus control logic further comprises a latency logic that generates an estimated latency signal wherein the second buffer data signal is responsive to the estimated latency signal. In another instance of this embodiment, the bus control logic further comprises a target burst logic that generates an optimal burst length signal representative of the length of a piece of data which will optimize an individual data transfer between the host computer and the buffer memory. In one case the second buffer data signal comprises the difference of the estimated latency signal and the optimal burst length signal.

In a further characterization of this embodiment the estimated latency signal comprises an estimate of the amount of data transfer that would occur between the host computer and the buffer memory during a time period comprising the latency time of the previous data transfer between the host computer and the buffer memory.

In a still further characterization, the target burst logic comprises monitor logic that monitors the size of each data burst transferred between the host computer and the buffer memory; and a first compare logic that updates the value of the optimal burst length signal such that the optimal burst length signal comprises a value representative of the size of the maximum sized data packet transferred between the host computer and the buffer memory since the host computer was powered on. In this case, the dynamic bus request logic asserts the bus request signal when the value of the first buffer data signal satisfies a logic relation to the value of the second buffer data signal.

Each of the above embodiments of the network adapter apparatus may be further characterized in that the bus control logic also includes a priority logic that provides a priority threshold signal to the dynamic bus request logic such that the dynamic bus request logic asserts the bus request signal when the value of the first buffer data signal is one of greater than and less than the priority threshold signal. In one instance, the priority threshold signal comprises a signal generated in response to previous transfers of data between the host computer and the network medium. Also, the buffer memory may comprise a memory that is smaller than the maximum size data packet utilized in the communication system.

Accordingly, the present invention provides a method and apparatus for dynamically controlling the requesting of a host computer expansion bus in order to maximize the efficiency of data transfer to and from a network medium to which the host computer is coupled while minimizing the number of underruns and overruns in the system.

Other aspects and advantages of the present invention can be seen upon review of the figures, the detailed description, and the claims which follow.

3. A BRIEF DESCRIPTION OF THE FIGURES

The figures illustrate the invention by way of example, and not limitation. Like references indicate similar elements.

Figure 4A:
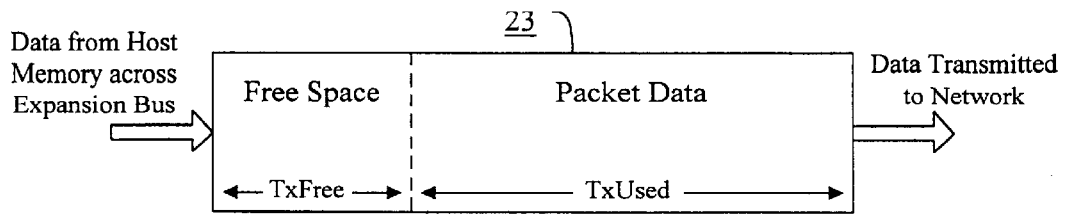
Figure 4B:
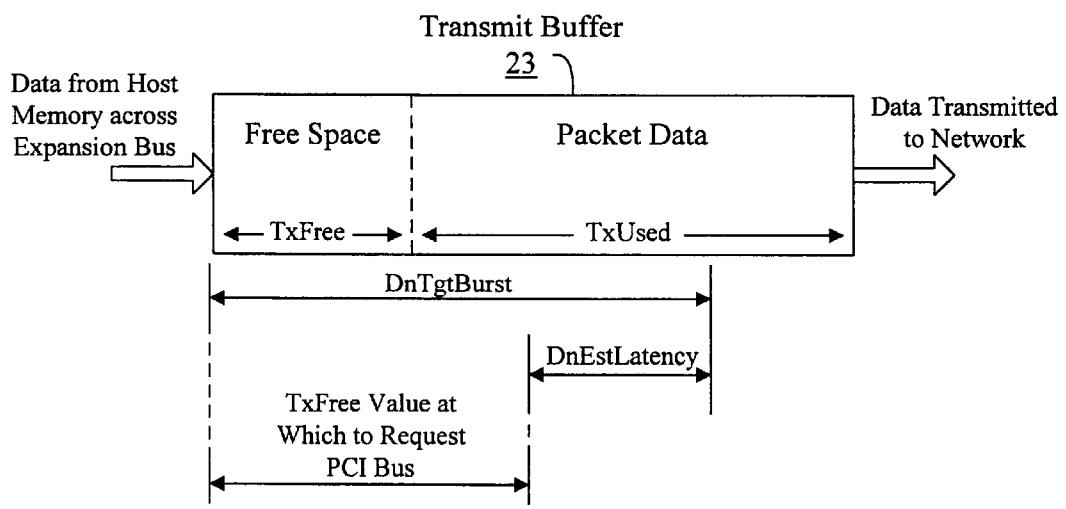
Figure 4C:
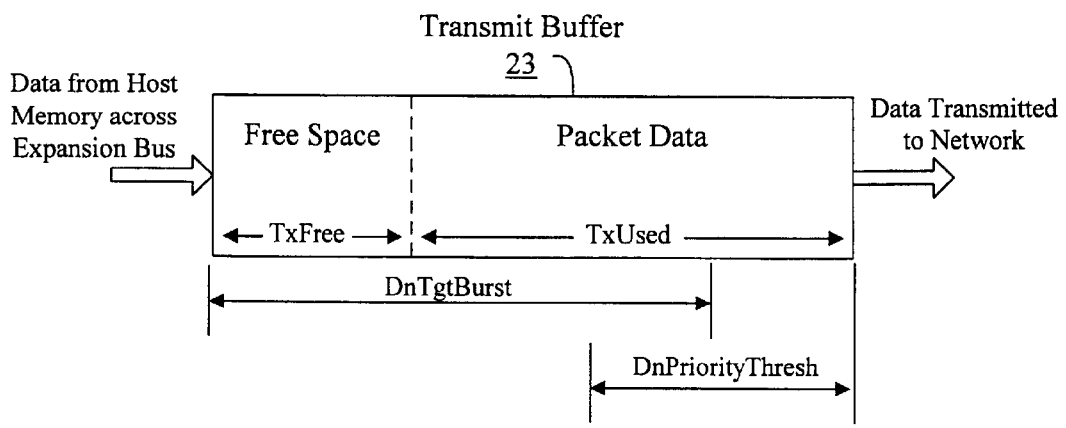

FIGS. 4(a)–(c) illustrate a simplified model of the transmit buffer of a network adapter configured to operate in accordance with the present invention.

Figure 5:
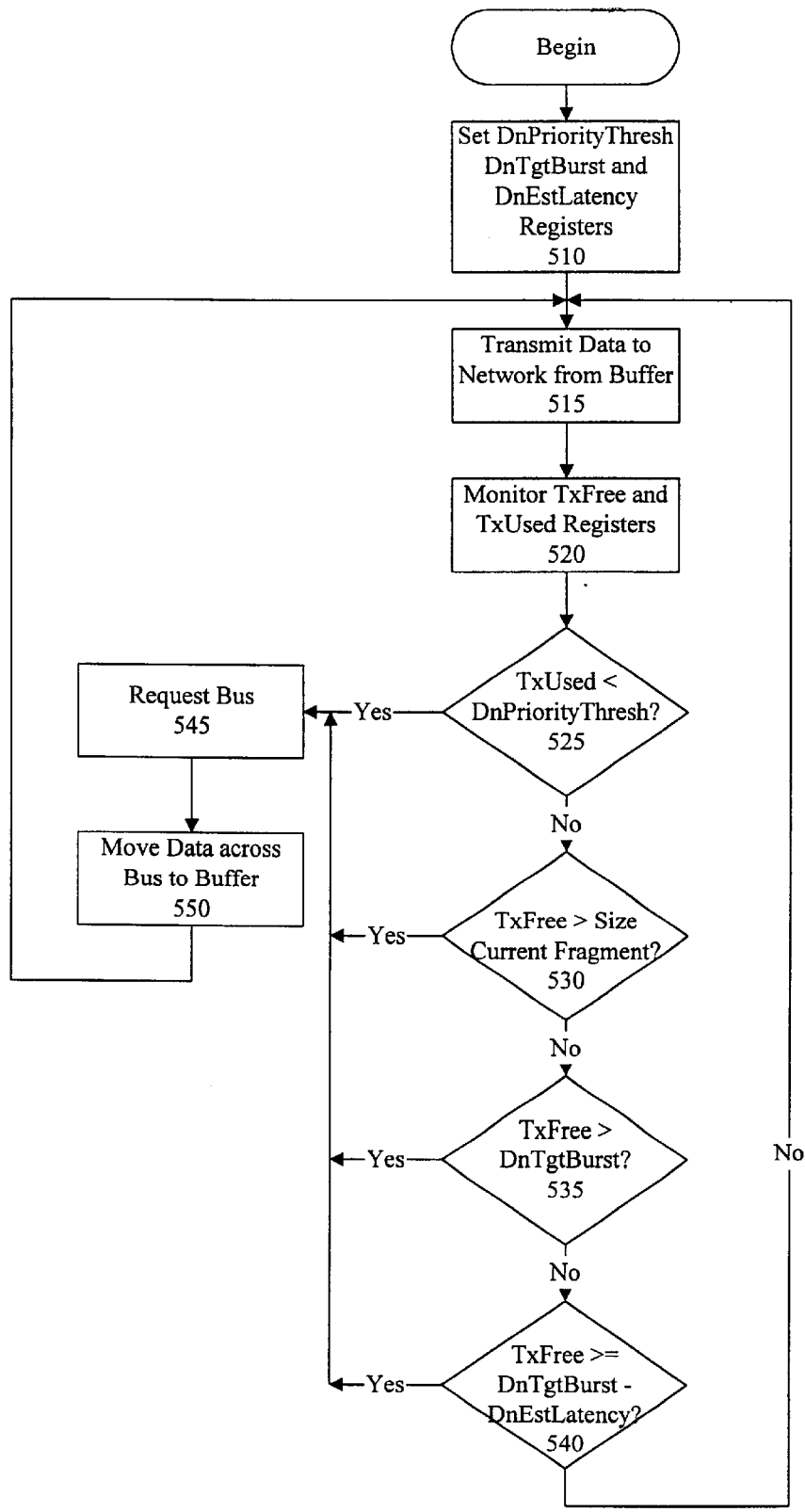
Figure 6A:
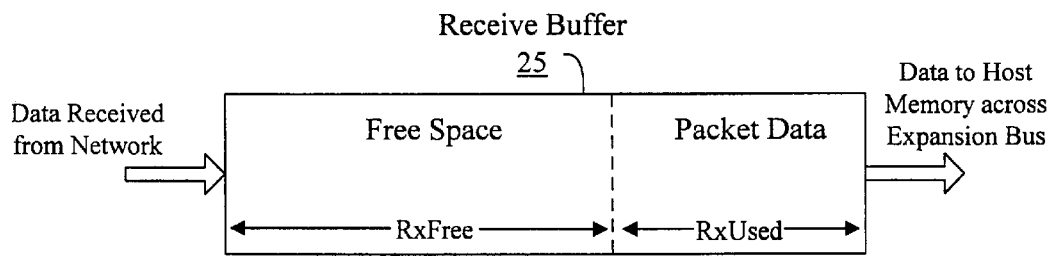
Figure 6B:
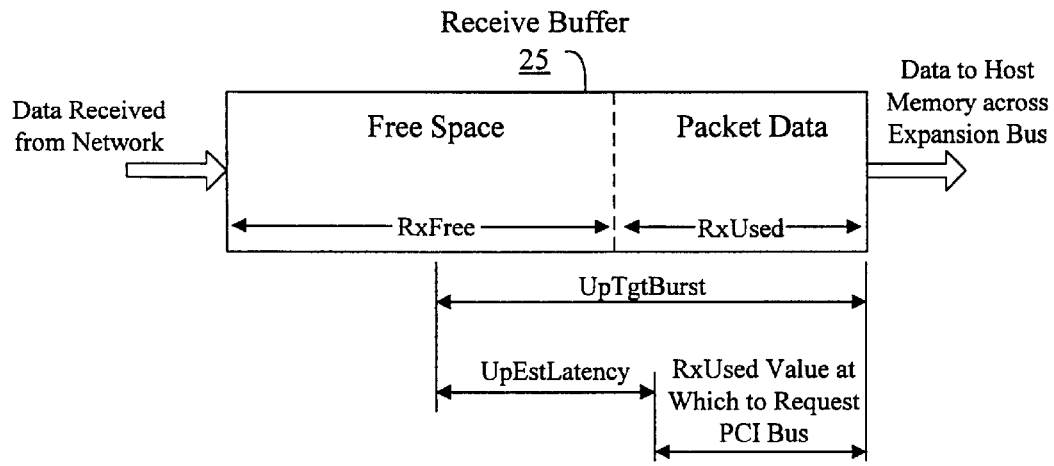
Figure 6C:
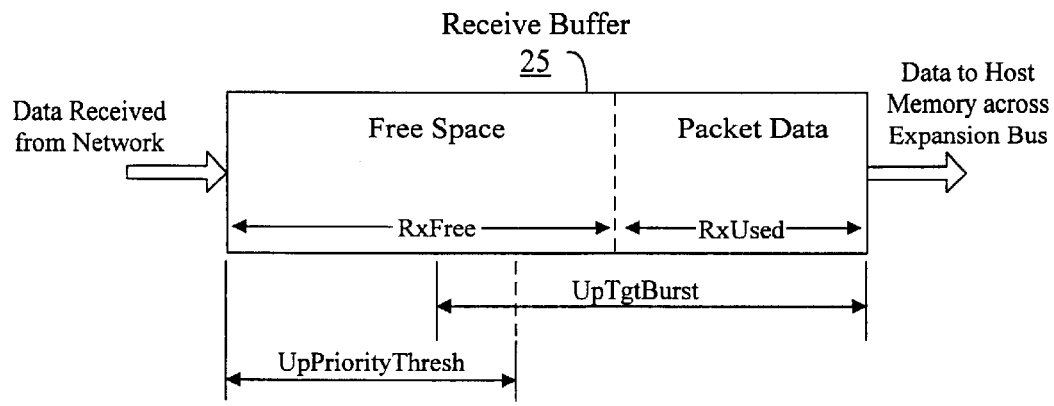

FIG. 5 illustrates a simplified process flow diagram describing a network adapter transmit mechanism in accordance with the present invention, FIGS. 6(a)–(c) illustrate a simplified model of the receive buffer of a network adapter configured to operate in accordance with the present invention.

Figure 7:
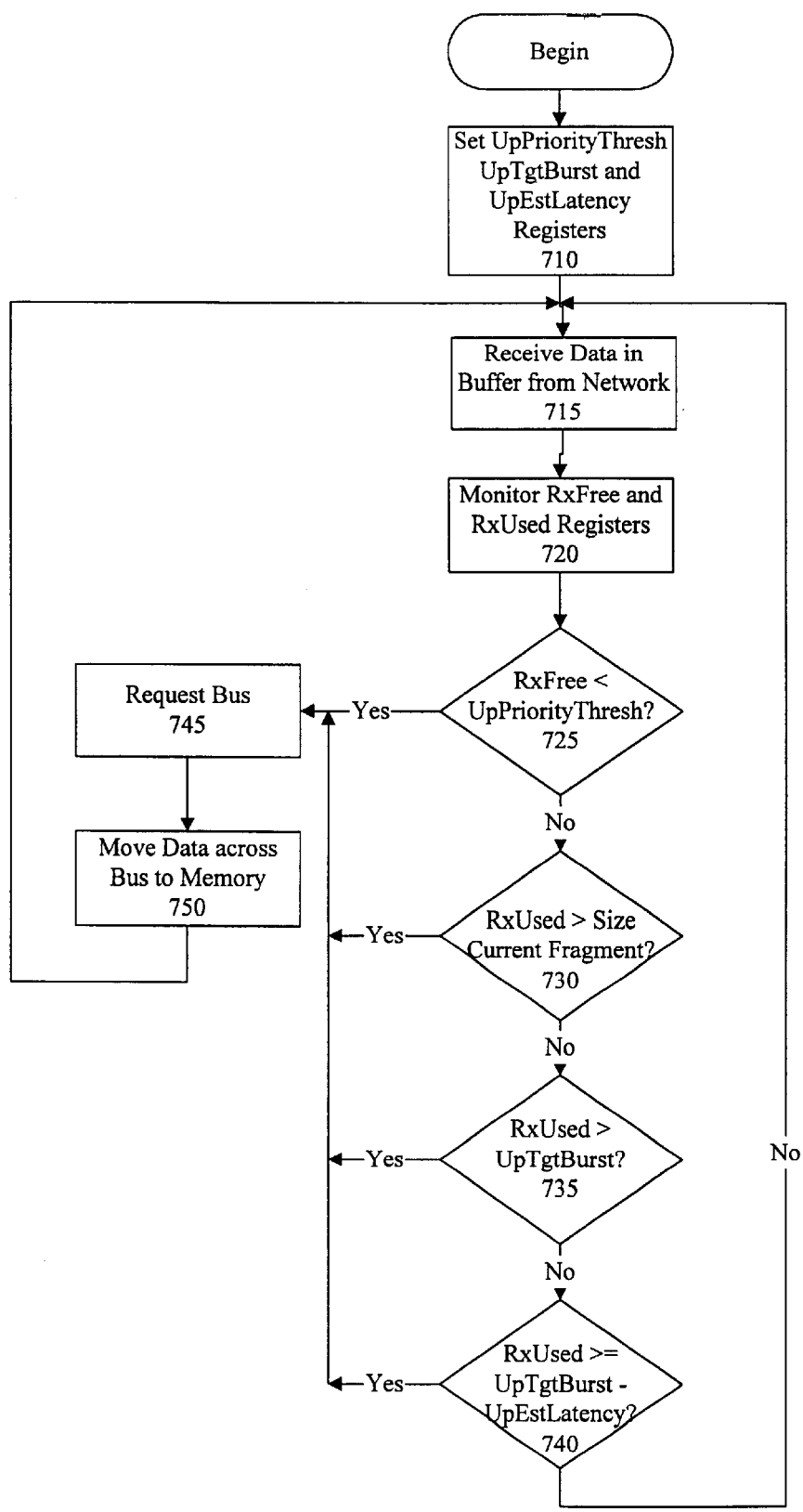

FIG. 7 illustrates a simplified process flow diagram describing a network adapter receive mechanism in accordance with the present invention.

4. DETAILED DESCRIPTION

The present invention provides a method and apparatus for dynamically controlling the requesting of a host system expansion bus in order to maximize the efficiency of data transfer to and from a network medium to which the host system is coupled. The present invention therefore, provides, a mechanism by which the network adapter can maximize its use of a particular bus tenure time by providing for the transmission and receipt of maximally sized data bursts while simultaneously receiving/transmitting data to the network. In one embodiment this includes a mechanism residing within a network adapter that allows the adapter to perform optimally in any system by adapting to the given host bridge architecture. In another embodiment, the invention includes a mechanism residing within a network adapter that causes the adapter to request the bus at a time which takes into account the latency time associated with a bus request such that data transfer from/to the network adapter begins at a time which optimizes the utilization of the size of the buffers within the network adapter. A detailed description of preferred embodiments is provided below with respect to the figures.

Figure 1:
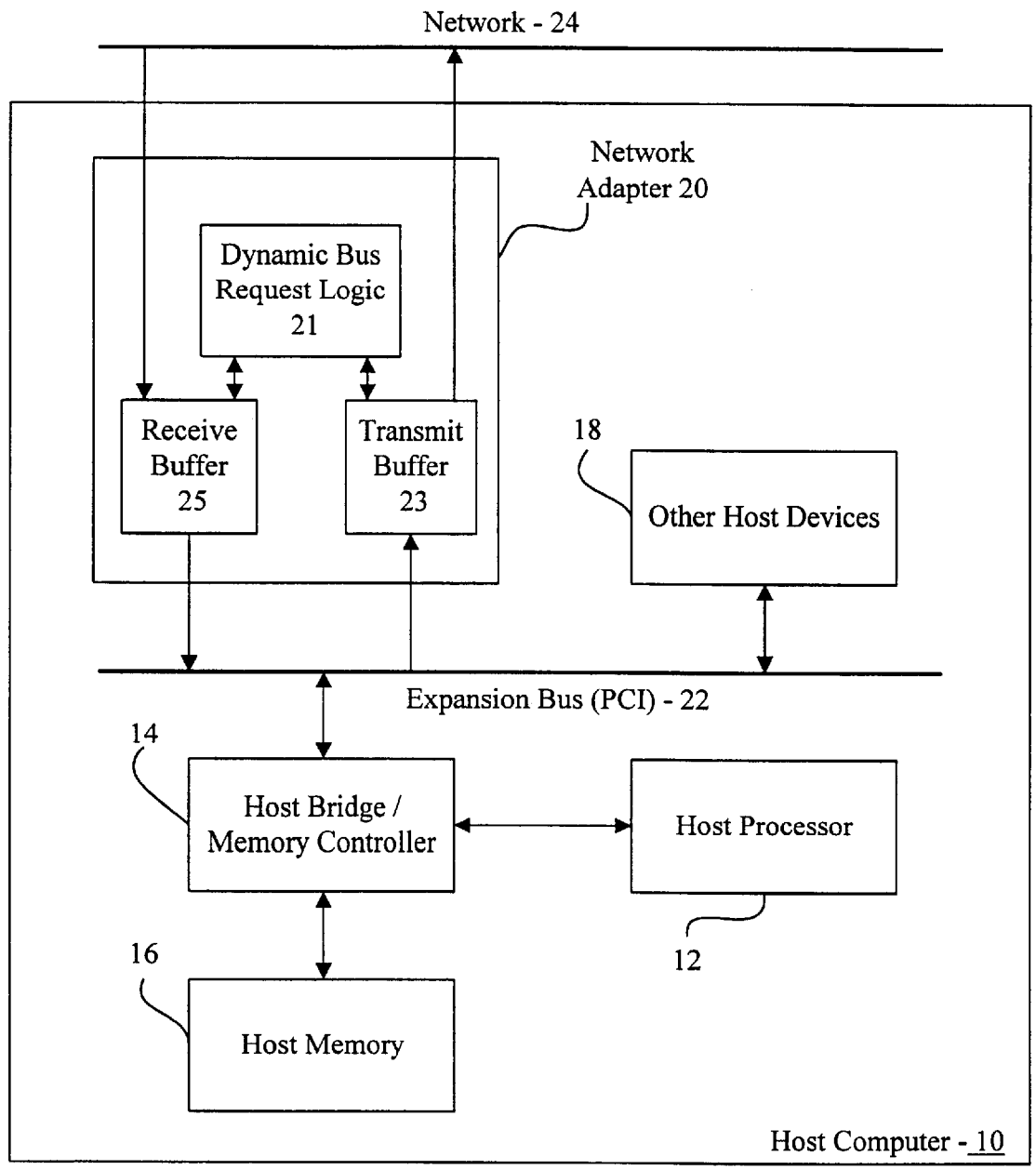
FIG. 1 illustrates, in block diagram form, computer system utilizing a network adapter configured according to one embodiment of the present invention.

FIG. 1 illustrates a network adapter configuration according to one embodiment of the present invention. The figure illustrates a host computer 10 coupled to a network medium 24. In one embodiment the network medium 24 is an Ethernet. The host computer 10 comprises a host processor 12, a host memory 16, a host bridge/memory controller 14, a network adapter 20, an expansion bus 22, and other host devices 18. The host computer 10 is coupled to the network 24 through the network adapter 20. The network adapter 20 is coupled to the network 24 and the expansion bus 22. The host processor 12 is coupled to the host bridge/memory controller 14. The host memory 16 is coupled to the host bridge/memory controller 14, and the other host devices 18 are also coupled to the expansion bus 22. The other host devices 18 may include various input/output devices such as controllers for keyboard, mouse, hard disk drive, a CDROM drive, and monitor. The host processor 12 controls the overall operation of the host computer 10. The host bridge/memory controller 14 serves as an intermediary device which allows the host memory 16 to communicate with other devices in the host computer 10.

The expansion bus 22, which may comprise for example and not limited to an EISA bus or a PCI bus, contains address lines which define a host system address space. Typically, for instance for an EISA bus, there are 32 address lines establishing a host system address space of about 4 gigabytes. Typically, devices coupled to the expansion bus 22, such as the network adapter 20 and other host devices 18, request service from host processor 12 by generating an interrupt on expansion bus 22.

The network adapter 20, which is illustrated as comprising a dynamic bus request logic 21, is responsible for transferring data frames between network 24 and host memory 16. When the host processor 12 determines that data is to be transferred from the host memory 16 to the network 24, it signals the network adapter 20 which then takes control of the expansion bus 22 via a bus request signal, and the network adapter 20 reads data from the host memory 16 through the host bridge 14 and stores this data in a transmit buffer prior to or simultaneously with transmission of this data onto the network 24. Similarly, when data is being received from the network 24 into a receive buffer of the network adapter 20, the network adapter 20 requests the expansion bus 22 so that the data can then be passed on to the host memory 16. As stated above, these bus requests should occur such that underruns and overruns do not occur during system operation. In one embodiment of the invention, the dynamic bus request logic 21 operates to determine when the network adapter 20 should request the expansion bus 22 during both transmit and receive operations such that the size of the transmit and receive buffers are optimally utilized without causing an undue number of underruns and overruns. In one embodiment the dynamic bus request logic 21 adapts to the given host bridge 14 architecture of the particular host system 10 to which the network adapter 20 is coupled to. In another embodiment, the dynamic bus request logic 21 causes the adapter to request the expansion bus 22 at a time which takes into account the latency time associated with a bus request. In still another embodiment, the dynamic bus request logic 21 comprises a mechanism for requesting the expansion bus 22 such that when the values of the transmit 23 and receive 25 buffers reach respective thresholds, then the expansion bus 22 is requested in order to avert an underrun or overrun.

Figure 2:
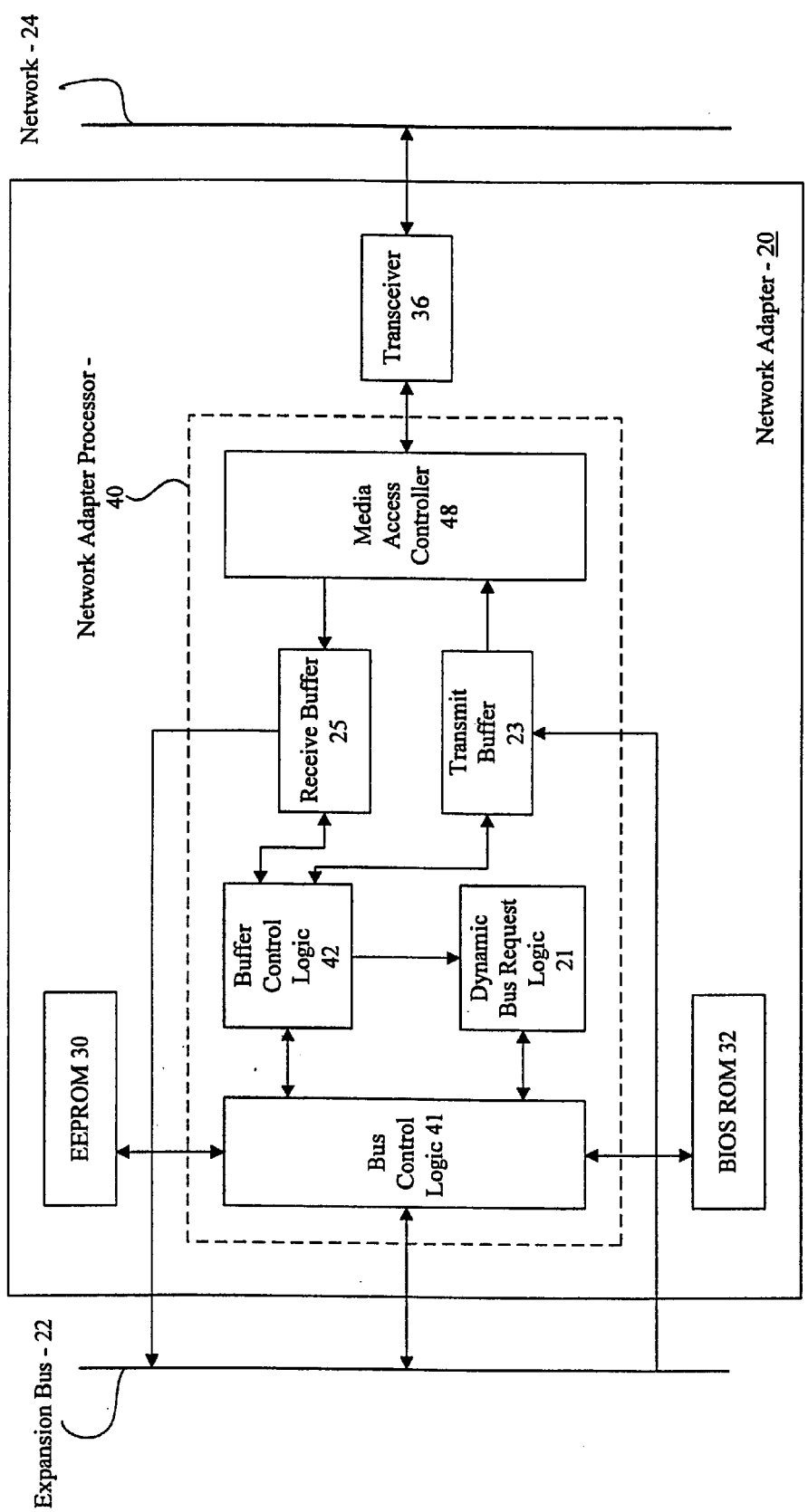
FIG. 2 illustrates, in functional block diagram form, a network adapter which embodies the present invention.

FIG. 2 illustrates a functional block diagram of the network adapter 20 of FIG. 1. The network adapter 20 is coupled to PCI Bus 22 and network medium 24 as described above with respect to FIG. 1. The network adapter 20 includes EEPROM 30, BIOS ROM 32, transceiver 36, and network adapter processor 40. The network adapter processor 40 includes bus control logic 41, buffer control logic 42, media access controller 48, dynamic bus request logic 21, receive buffer 25, and transmit buffer 23.

As shown in FIG. 2, the EEPROM 30 and the BIOS ROM 32 are coupled to the bus control logic 41 of the network adapter processor 40. The transceiver 36 is coupled to the media access controller 48 of the network adapter processor 40 and also to the network medium 24. In one embodiment, the EEPROM 30 is utilized to store critical network adapter 20 specific data that is used by drivers, diagnostics, and network management software. This data is stored during the manufacturing process. During initialization of the network adapter 20, the contents of the EEPROM 30 are loaded into the network adapter processor 40 for use during operation. In one instance, the EEPROM 30 is a 64 word (16 bit) serial EEPROM that stores configuration information such as PCI Device ID, station address, and transceiver selection—thus following a reset or power on of one embodiment of the network adapter 20, the information stored in the EEPROM 30 is used to initialize the various bus configuration and input/output registers of the adapter 20 by loading values in the EEPROM 30.

The BIOS ROM 32, in one embodiment of the network adapter 20, provides an extension to the host computer system's 10 basic input/output code (BIOS), by providing extra source code to be executed at computer system 10 boot up time. In one instance, the BIOS ROM 32 contains up to 128 KB of source code to be executed by the host computer system 10. Further, in one instance, the BIOS ROM 32 is configured through a PCI bus configuration register that causes the BIOS ROM 32 to be mapped in the host memory 16 of the host computer 10 such that the BIOS ROM 32 contents can be scanned, copied to system memory 16, and executed at initialization time. In this instance, the BIOS ROM 32 is also byte-read and byte-write accessible to the host processor 12 via registers. This allows a diagnostic program to read or modify the BIOS ROM 32 contents without having to write to configuration registers.

In one embodiment of the invention, the transceiver 36 transmits data from the transmit buffer 23 to the network medium 24 in response to appropriate control signals from the media access controller 48. Similarly, the transceiver 36 receives data from the network medium 24 and passes this data to the receive buffer 25 in response to appropriate control signals from the media access controller 48. In a particular embodiment the transceiver may comprise either a thin Ethernet (coax/BNC) transceiver or a 10BaseT (Type 3/RJ-45) transceiver. Similarly, in a particular embodiment, the control signals from the media access controller 48 are produced using conversion logic on an encoder/decoder chip resident on the media access controller 48.

The aforementioned elements of the network adapter processor 40 of the network adapter 20 are functionally coupled as illustrated in FIG. 2. The receive buffer 25, which in one particular embodiment is a 2 KB data buffer, is functionally coupled to the media access controller 48, the buffer control logic 42, and the PCI Bus 22. The transmit buffer 23, which in one particular embodiment is a 2 KB data buffer, is also functionally coupled to the media access controller 48, the buffer control logic 42, and the PCI Bus 22. The buffer control logic 42 is additionally coupled to the bus control logic 41 and the dynamic bus request logic 21 as illustrated. The dynamic bus request logic 21 is coupled to the buffer control logic 42 and the bus control logic 41 as shown. Finally, the bus control logic 41 is coupled to the PCI Bus 22.

As the present invention is concerned with the dynamic requesting of the bus 22 by the network adapter 20, a full description of the mechanism by which a host computer 10 may transmit data back and forth to a network medium 24 will be foregone in this description, as it is well known in the art, lengthy, and unnecessary to the understanding of the current invention. As such only a brief and simple discussion of this mechanism is set forth herein. If the reader wishes a more detailed explanation of this process he may refer to U.S. Pat. No. 5,307,459 entitled "Network Adapter with Host Indication Optimization", invented by Petersen et. al, and assigned to the assignee of the present invention, which is hereby incorporated by reference herein. Similarly, U.S. patent application Ser. No. 5,434,872 entitled "Apparatus for Automatic Initiation of Data Transmission", invented by Petersen et. al, and assigned to the assignee of the present invention, is also incorporated by reference herein.

With this in mind, the network adapter 20 transmits data to the network medium 24 from the host computer system 10 as follows in one embodiment. As data resident in the transmit buffer is being transmitted to the network medium 24 by the transceiver 36 under the control of the media access controller 48, the buffer control logic 42 monitors the amount of free space available in the transmit buffer 23, and the buffer control logic 42 provides this information to the dynamic bus request logic 21. The dynamic bus request logic 21 utilizes this information—along with information provided by the bus control logic 41 relating to the latency of a network adapter bus request and the maximum download burst size of data from the host memory 16—in order to make a bus request to the PCI Bus 22 through the bus control logic 41 at a time at which the bus tenure time can be optimally utilized as will be described more fully below with respect to FIGS. 3, 4, and 5. Similarly, the network adapter 20 receives data from the network medium 24 and passes this data to the host memory 16 of the host computer system 10 as follows in one embodiment. As data is received by the receive buffer 25 from the network medium 24 via the transceiver 3 6 under the control of the media access controller 48, the buffer control logic 42 monitors the amount of used space in the receive buffer 25, and the buffer control logic 42 provides this information to the dynamic bus request logic 21. The dynamic bus request logic 21 utilizes this information—along with information provided by the bus control logic 41 relating to the latency of a network adapter bus request and the maximum upload burst size of data to the host memory 16—in order to make a bus request to the PCI Bus 22 through the bus control logic 41 at a time at which the bus tenure time can be optimally utilized as will be described more fully below with respect to FIGS. 3, 6, and 7.

Figure 3:
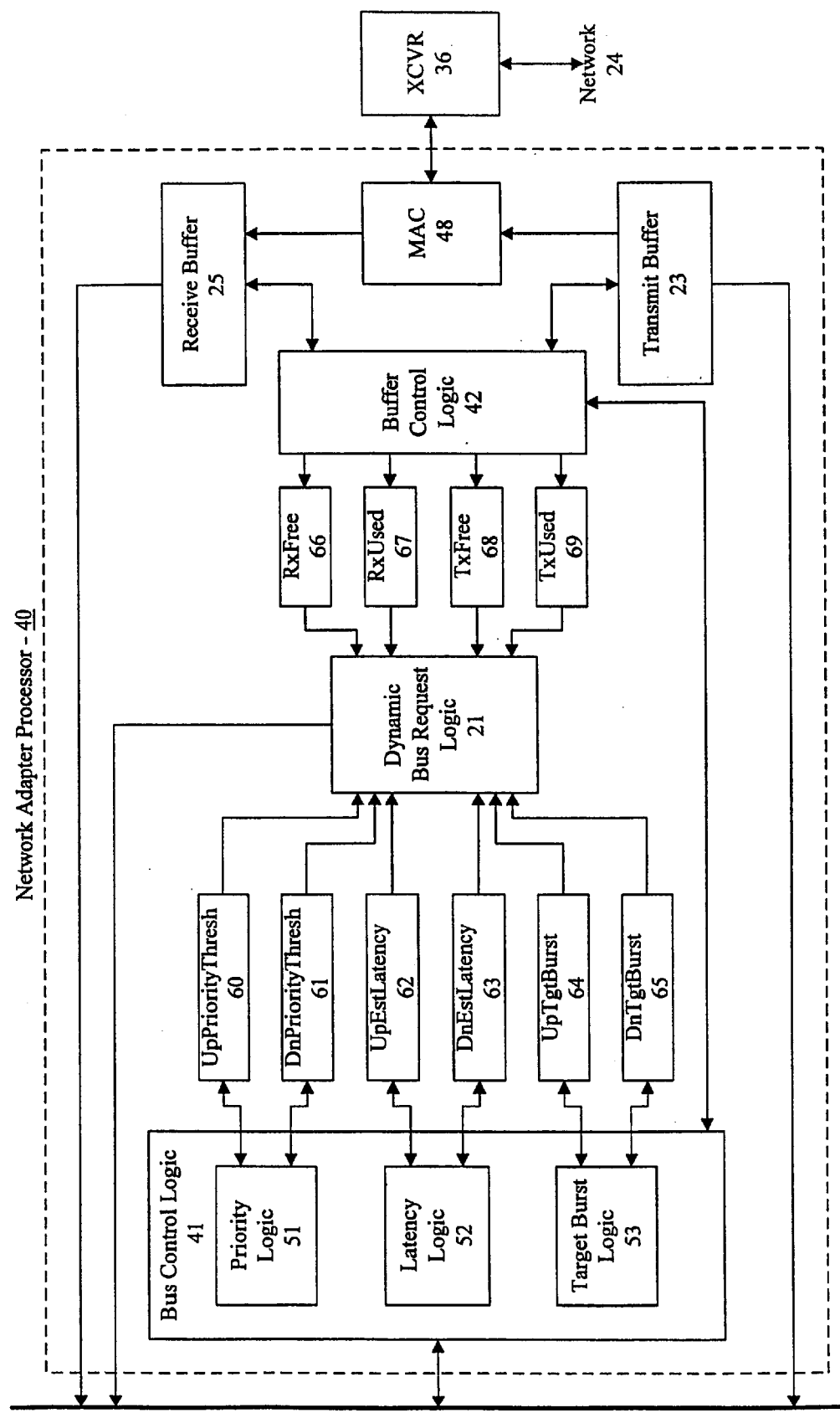
FIG. 3 illustrates, in more detailed block diagram form, the network adapter processor logic of the network adapter of FIG. 2.

The invention is further described with respect to FIG. 3 which further illustrates the network adapter processor 40 of FIG. 2. As described above, the network adapter processor 40 includes bus control logic 41, dynamic bus request logic 21, buffer control logic 42, receive buffer 25, transmit buffer 23, and media access controller 48. Also included in the network adapter processor 40 are: UpPriorityThresh register 60, DnPriorityThresh register 61, UpEstLatency register 62, DnEstLatency register 63, UpTgtBurst register 64, DnTgtBurst register 65, RxFree register 66, RxUsed register 67, TxFree register 68, and TxUsed register 69. The bus control logic further includes priority logic 51, latency logic 52, and target burst logic 53.

The priority logic 51 operates to update the values of the UpPriorityThresh 60 and DnPriorityThresh 61 registers in accordance with the present invention. Further, the latency logic 52 operates to update the values of the UpEstLatency 62 and DnEstLatency 63 registers in accordance with the present invention. Finally, the target burst logic 53 operates to update the UpTgtBurst 64 and DnTgtBurst 65 registers in accordance with the present invention. Similarly, the buffer control logic 42 operates to monitor the receive buffer 25 continuously and to update the values of the RxFree 66 and RxUsed 67 registers. The buffer control logic 42 also operates to monitor the transmit buffer 23 continuously and to update the values of the TxFree 68 and TxUsed 69 registers.

The dynamic bus request logic 21 receives the values of the UpPriorityThresh register 60, UpEstLatency register 62, UpTgtBurst register 64, RxFree register 66, and RxUsed register 67 in order to determine when to request the PCI Bus 22 for the transfer of data from the receive buffer 25 to the host memory 16 in accordance with the present invention as will be described below in further detail and also with respect to FIGS. 6 and 7. Similarly, the dynamic bus request logic 21 receives the values of the DnPriorityThresh register 61, DnEstLatency register 63, DnTgtBurst register 65, TxFree register 68, and TxUsed register 69 in order to determine when to request the PCI Bus 22 for the transfer of data from the host memory 16 to the transmit buffer 23 in accordance with the present invention as will be described below in further detail and also with respect to FIGS. 4 and 5.

The network adapter processor 40 can be further described with respect to the function of the target burst logic 53, the latency logic 52, and the priority logic 51. The target burst logic 53 operates to set values for the UpTgtBurst 64 and DnTgtBurst 65 registers such that the network adapter 20 requests the bus 22 at such a time as to maximize the amount of data that is passed from/to the network adapter 20 during a particular bus tenure. In one instance, UpTgtBurst is equal to the maximum upload data burst size that has occurred in the system since the current power on of the host computer system 10. Similarly, in this instance the DnTgtBurst is equal to the maximum download data burst size that has occurred in the system since the current power on of the host computer system 10. In one embodiment of the above instance, the DnTgtBurst 65 and UpTgtBurst 64 registers are continuously updated as the system operates. For instance, the bus control logic 41 monitors the size of each data burst passed to the transmit buffer 23 from the host memory 16, and whenever the size of a burst is greater than the burst size currently recorded in the DnTgtBurst register 65, the DnTgtBurst register 65 is updated with the new value. Similarly, the bus control logic 41 monitors the size of each data burst passed from the receive buffer 25 to the host memory 16, and whenever the size of a burst is greater than the burst size currently recorded in the UpTgtBurst register 64, the UpTgtBurst register 64 is updated with the new value.

In the typical host system 10 utilizing this embodiment, a stable value for both the UpTgtBurst and DnTgtBurst registers would be obtained in a relatively short period. In another embodiment, the UpTgtBurst and DnTgtBurst registers can be set at initial host system 10 power on by providing a mechanism by which the network adapter 20 queries the host computer as to its hardware capabilities and sets the values of the UpTgtBurst and DnTgtBurst registers accordingly. In still another embodiment, the initial values of the UpTgtBurst and DnTgtBurst registers could be set via the aforementioned query, and could be subject to a continuous update as also described above. In still another embodiment, it might also be desirable to allow the network adapter's device driver software (running on the host processor 12) to be able to override the accumulated values in the DnTgtBurst and UpTgtBurst registers, to force the network adapter 20 to use a different target burst length. In the above embodiments, the current invention provides a mechanism by which the particular burst length capabilities of a particular system can be utilized to dynamically maximize the use of upload and download bus tenures.

The latency logic 52 operates to set values for the UpEstLatency 62 and DnEstLatency 63 registers such that the network adapter 20 requests the bus 22 at such a time as to maximize the amount of data that is passed from/to the network adapter 20 during a particular bus tenure such that overruns and underruns are minimized. In one embodiment, the bus control logic 41 includes a latency timer logic which serves to monitor the time that transpires between when the dynamic bus request logic 21 requests the use of the expansion bus 22 from the host computer 10 and when the host computer 10 grants the use of the bus 22 to the network adapter 20 and the amount of time it then takes until data is being passed across the bus 22. In one embodiment, this latency timer logic may comprise an 8 or 10 bit counter. In one embodiment, this timer measures this time for each bus request and both the UpEstLatency and DnEstLatency registers are set to equal the most recent timer value resident in the latency timer logic. In this manner, the UpEstLatency value and the DnEstLatency value utilized by the dynamic bus request logic 21 to determine when to request the bus 22 are both equal to the actual latency of the immediately preceding bus latency/tenure occurrence. In another embodiment the latency timer logic records separate times for upload bus requests and download bus requests, and provides the most recent recorded times to the UpEstLatency and DnEstLatency registers respectively. In still another embodiment, the values resident in the UpEstLatency and DnEstLatency registers may be set by taking an average or a weighted average of all the latency times that have been measured since the host system 10 has been powered on. Therefore, as will be described more fully below, the above embodiments describe a manner by which the bus 22 may be dynamically requested by the network adapter 20 such that the time it normally takes the particular host computer system 10 to grant the bus 22 to the network adapter 20 is taken into account when the network adapter 20 requests the bus 22.

Further, the priority logic 51 operates to set values for the UpPriorityThresh 60 and DnPriorityThresh 61 registers such that the network adapter 20 requests the bus 22 at such a time as to minimize overruns and underruns. In one instance, the UpPriorityThresh and DnPriorityThresh registers are statically set at initial host system 10 power on. In an alternative form of this embodiment, these registers are set initially in response to the queried hardware capabilities of the host system 10. In another embodiment, the UpPriorityThresh and DnPriorityThresh registers can be dynamically set in response to the average bus latency values seen by the network adapter 20. In still another embodiment, the network adapter 20 measures the number of underruns and/or overruns that occur over a period of time, and the value of the UpPriorityThresh and DnPriorityThresh registers are updated in order to increase/decrease the number of underruns and/or overruns such that a desired balance of burst transmission efficiency and underrun/overrun is accomplished, which in one instance is adjustable by the host system 10 user.

The network adapter processor 40 of FIG. 3 operates to transmit data from the host memory 16 to the transmit buffer 23 generally as described below. The dynamic bus request logic 21 adjusts the point at which the bus 22 is requested, based upon the amount of free space in the transmit buffer (TxFree 68), the estimated bus latency (DnEstLatency 63), and the maximum read burst length (DnTgtBurst 65) supported by the host system 10 chipset. The bus control logic 41 allows the network adapter 20 to operate on the expansion bus 22, including instigating the bus master operations which perform transmit data movements across the bus 22. Bus control logic 41 is also responsible for maintaining the DnTgtBurst, DnEstLatency, and DnPriorityThresh registers as described previously.

DnTgtBurst represents the "target" burst length for transmit data movements across the bus 22. In general, the network adapter 20 will attempt to move DnTgtBurst bytes across the bus 22 in every transmit data burst. Bus control logic 41 monitors the adapter's transmit bus master operations, and automatically accumulates the length (in bytes) of the longest burst in DnTgtBurst. The DnTgtBurst register 65 is updated in the manner described previously above.

DnEstLatency contains the estimated latency for the next transmit data burst on the bus. The estimated latency includes both the delay from bus request to bus grant (the bus latency), and the delay from bus grant to when the first transmit data comes across the bus (the data latency). A number of methods may be utilized by the bus control logic 41 to compute DnEstLatency. Although DnEstLatency is a measure of delay on the expansion bus 22, it is expressed in terms of byte transmission time on the network interface. For example, the latency might be measured in 1.25 microsecond quanta, which is the time required to transmit 16 bytes on a 100 Mbps network.

DnPriorityThresh is a register which, as described previously, may be written by the host driver software (running on the host processor 12) to set an alternate point at which to request the bus 22. When the amount of packet data in the transmit buffer 23 falls below DnPriorityThresh, a priority bus request is made to try to avoid a transmit underrun, regardless of whether this will generate a burst smaller than the target burst. DnPriorityThresh might be set once at initialization time and remain a static value, or it might be dynamically managed by the driver software to maximize bus throughput and efficiency while maintaining an acceptable level of underruns.

The transmit buffer 23 holds transmit data on the network adapter 20 in preparation to be transmitted to the network medium 24. The buffer control logic 42 manages the transmit buffer 23, and maintains the TxFree 68 and TxUsed 69 registers. TxFree represents the current amount of free space in the transmit buffer 23, and TxUsed represents the amount of packet data currently in the transmit buffer 23. For a given transmit buffer 23 size, TxFree and TxUsed are complementary. TxFree 68 and TxUsed 69 may not be implemented as two separate register structures, but rather inferred from one register value.

The dynamic bus request logic 21 includes logic which determines when the network adapter should request the bus 22 as will now be described with reference to FIGS. 4 and 5. FIG. 4(*a*) illustrates a simplified model of the transmit buffer 23. Data from across the expansion bus 22 enters the transmit buffer 23 from the left, and data transmitted to the network medium 24 exits to the right. Packet data in the transmit buffer 23 is represented by TxUsed, and free space in the transmit buffer 23 is represented by TxFree. The dividing line between Packet Data and Free Space in this model moves to the right as data is transmitted, and moves left as data is put into the buffer from the PCI bus. FIG. 4(*b*) illustrates a simplified model of the transmit buffer 23 in which the primary bus request mechanism of the present invention is utilized to request the bus 22 for a data download. As shown, the dynamic bus request logic 21 asserts a bus request command to the host computer 10 via the bus control logic 41 when conditions satisfying equation (1) below are met:

$$\text{TxFree} \geq \text{DnTgtBurst} - \text{DnEstLatency} \tag{1}$$

The principle is that the bus 22 is requested early, by an amount equal to the estimated latency, so that by the time the bus is actually granted, exactly DnTgtBurst bytes are free in the transmit buffer 23. This allows the most efficient burst to take place on the bus 22, and minimizes the chance of underrun due to latency.

In most operating system environments, transmit packets are moved from host memory 16 in more than one piece. Each piece is referred to as a fragment, and may range in size from a few bytes to over a thousand bytes. Given this concept of fragmented packets, in one embodiment of the present invention the following rules govern when a bus request is made:

1. If the space available in the transmit buffer 23 is greater than the size of the current fragment, request the bus.
2. If the space available in the transmit buffer 23 is greater than the maximum read burst length supported by the system (as indicated by DnTgtBurst), request the bus.
3. If the space in the transmit buffer 23 is less than the current fragment size and less than the maximum system read burst length, request the bus according to equation (1), above.

Additionally, FIG. 4(*c*) illustrates a simplified model of the transmit buffer 23 in which the priority bus request mechanism of the present invention is utilized to request the bus 22 for a data download. As shown, the dynamic bus request logic 21 asserts a priority bus request command to the host computer 10 via the bus control logic 41 whenever the value of the TxUsed register 69 falls below the value set in the DnPriorityThresh register 61. From this it is clear then that the DnPriorityThresh register 61 is only useful when, for a particular host computer system utilizing the present invention, conditions satisfying equation (2) below are satisfied:

$$\text{DnPriorityThresh} > \text{Transmit Buffer Size} - \text{DnTgtBurst} \tag{2}$$

If DnPriorityThresh does not meet this condition, then the bus 22 will always be requested by the primary mechanism illustrated in FIG. 4(b) before the DnPriorityThresh threshold is crossed. In one embodiment of the present invention, the dynamic bus request logic 21 implements the above described transmit logic functionality through the implementation of digital circuitry using well known circuit design methods.

The above discussion of the transmit mechanism in accordance with the present invention with respect to FIG. 4 is further described by the simplified process flow diagram illustrated in FIG. 5. Thus as shown in FIG. 5, the process begins at process block 510 with the setting of values for the DnTgtBurst register 65, the DnEstLatency register 63, and the DnPriorityThresh register 61 which is accomplished as previously described with respect to several embodiments of the target burst logic 53, the latency logic 52, and the priority logic 51. At process block 515, data from the transmit buffer 23 is transmitted to the network medium 24 as described earlier via the transceiver 36 as controlled by the media access controller 48. (The transmission of data occurs actually independent of this process). Process block 520 shows that the TxFree and TxUsed registers are continuously updated by the buffer control logic 42 which continuously monitors the amount of free and used space in the transmit buffer 23 as described earlier. Next, at process block 525, a decision is made. If the value of the TxUsed register 69 is less than the value of the DnPriorityThresh register 61, then the bus 22 is requested by the dynamic bus request logic 21 at block 545, and once the bus 22 is granted by the host computer 10, data is moved across the bus 22 from the host memory 16 to the transmit buffer 23. If the decision block 525 proves false, then the process continues to decision block 530 where if the value of the TxFree register 68 is greater than the size of the current data fragment awaiting download, then the bus 22 is requested at block 545 and data is moved in accordance with block 550 when the bus is granted. If the condition of block 530 proves false, then the process continues to decision block 53 5 where if the value of the TxFree register 68 is greater than the DnTgtBurst register 65, then the bus 22 is requested at block 545 and data is moved in accordance with block 550 when the bus is granted. If the condition of block 535 proves false, then the process continues to decision block 540 where if the value of the TxFree register 68 is greater than or equal to the difference in the value of the DnTgtBurst register 65 and the DnEstLatency register 63, then the bus 22 is requested at block 545 and data is moved in accordance with block 550 when the bus is granted. Finally, if the condition of block 540 proves false then the process returns to block 515 where data continues to be transmitted to the network, and the process repeats itself continuously to determine when to optimally make transmit (download) bus requests in accordance with the present invention.

Similarly, the network adapter processor 40 of FIG. 3 operates to receive data from the network medium 24 and upload the data to the host memory 16 generally as described below. The dynamic bus request logic 21 adjusts the point at which the bus 22 is requested based upon the amount of data in the receive buffer (RxUsed 67), the estimated bus latency (UpEstLatency 62), and the maximum write burst length (UpTgtBurst 64) supported by the host system 10.

As before with respect to the transmit mechanism, the bus control logic 41 allows the network adapter 20 to operate on the expansion bus 22, including instigating the bus master operations which perform receive data movements across the bus 22. Bus control logic 41 is also responsible for maintaining the UpTgtBurst, UpEstLatency, and UpPriorityThresh registers as described previously.

UpTgtBurst represents the "target" burst length for receive data movements across the bus 22. In general, the network adapter 20 will attempt to move UpTgtBurst bytes across the bus 22 in every receive data burst. The bus control logic 41 monitors the adapter's receive bus master operations, and automatically accumulates the length (in bytes) of the longest burst in UpTgtBurst. The UpTgtBurst register 64 may be updated in the manners described previously.

UpEstLatency contains the estimated latency for the next receive data burst on the bus. As before, the estimated latency includes both the delay from bus request to bus grant (the bus latency), and the delay from bus grant to when the first receive data moves across the bus (the data latency). As discussed earlier, a number of methods may be utilized by the bus control logic 41. As with DnEstLatency, the UpEstLatency is expressed in terms of byte transmission time on the network interface.

UpPriorityThresh is a register which, as described previously, may be written by the host driver software (running on the host processor 12) to set an alternate point at which to request the bus 22. When the amount of free space in the receive buffer 25 falls below UpPriorityThresh, a priority bus request is made to try to avoid a receive overrun regardless of whether this will generate a burst smaller than the target burst.

The receive buffer 25 holds receive data on the network adapter 20 in preparation for it being moved to host memory 16. The buffer control logic manages the receive buffer 25, and maintains the RxFree 66 and RxUsed 67 registers. RxFree represents the current amount of free space in the receive buffer 25, and RxUsed represents the amount of packet data currently in the receive buffer 25. For a given receive buffer 25 size, RxFree and RxUsed are complementary. The RxFree 66 and RxUsed 67 values may be inferred from a common register/arithmetic structure.

The dynamic bus request logic 21 includes logic which determines when the network adapter should request the bus 22 as will now be described with reference to FIGS. 6 and 7. FIG. 6(a) illustrates a simplified model of the receive buffer 25. Data received from the network 24 enters the receive buffer 25 from the left, and data being moved across the expansion bus 22 to the host memory 16 exits to the right. Packet data in the receive buffer 25 is represented by RxUsed, and free space is represented by RxFree. FIG. 6(b) illustrates a simplified model of the receive buffer 25 in which the primary bus request mechanism of the present invention is utilized to request the bus 22 for a data upload. As shown, as data is received from the network 24, the dynamic bus request logic 21 asserts a bus request command to the host computer 10 via the bus control logic 41 when conditions satisfying equation (3) below are met:

$$PRxUsed \geq UpTgtBurst - UpEstLatency \qquad (3)$$

The principle is that the bus 22 is requested early, by an amount equal to the estimated latency, so that by the time the bus is actually granted, exactly UpTgtBurst bytes are available in the receive buffer 25. This allows the most efficient burst to take place on the bus 22, and minimizes the chance of overrun due to latency.

In most operating system environments, receive data packets, like transmit packets, are often moved to host memory 16 in more than one fragment. Given this concept of fragmented packets, in one embodiment of the present invention the following rules govern when a bus request is made:

1. If the data available in the receive buffer 25 is greater than the size of the current fragment, request the bus.
2. If the data available in the receive buffer 25 is greater than the maximum read burst length supported by the system (as indicated by UpTgtBurst), request the bus.
3. If the data in the buffer 25 is less than the current fragment size and less than the maximum system read burst length, request the bus according to equation (3), above.

Additionally, FIG. 6(c) illustrates a simplified model of the receive buffer 25 in which the priority bus request mechanism of the present invention is utilized to request the bus 22 for a data upload. As shown, the dynamic bus request logic 21 asserts a priority bus request command to the host computer 10 via the bus control logic 41 whenever the value of the RxFree register 66 falls below the value set in the UpPriorityThresh register 60. From this it is clear then that the UpPriorityThresh register 60 is only useful when, for a particular host computer system utilizing the present invention, conditions satisfying equation (4) below are satisfied:

$$\text{UpPriorityThresh} > \text{Transmit Buffer Size} - \text{UpTgtBurst} \quad (4)$$

If UpPriorityThresh does not meet this condition, then the bus 22 will always be requested by the primary mechanism illustrated in FIG. 6(b) before the UpPriorityThresh threshold is crossed. In one embodiment of the present invention, the dynamic bus request logic 21 implements the above described receive logic functionality through the implementation of digital circuitry using well known circuit design methods.

The above discussion of the receive mechanism in accordance with the present invention with respect to FIG. 6 is further described by the simplified process flow diagram illustrated in FIG. 7. Thus as shown in FIG. 7, the process begins at process block 710 with the setting of values for the UpTgtBurst register 64, the UpEstLatency register 62, and the UpPriorityThresh register 60 which is accomplished as previously described with respect to several embodiments of the target burst logic 53, the latency logic 52, and the priority logic 51. At process block 715, data is received in the receive buffer 25 from the network medium 24 as described earlier via the transceiver 36 as controlled by the media access controller 48. Process block 720 shows that the RxFree and RxUsed registers are continuously updated by the buffer control logic 42 which continuously monitors the amount of free and used space in the receive buffer 25 as described earlier. Next, at process block 725, a decision is made. If the value of the RxFree register 66 is less than the value of the UpPriorityThresh register 60, then the bus 22 is requested by the dynamic bus request logic 21 at block 745, and once the bus 22 is granted by the host computer 10, data is moved across the bus 22 from the receive buffer 25 to the host memory 16. If the decision block 725 proves false, then the process continues to decision block 730 where if the value of the RxUsed register 67 is greater than the size of the current data fragment awaiting upload, then the bus 22 is requested at block 745 and data is moved in accordance with block 750 when the bus is granted. If the condition of block 730 proves false, then the process continues to decision block 735 where if the value of the RxUsed register 67 is greater than the UpTgtBurst register 64, then the bus 22 is requested at block 745 and data is moved in accordance with block 750 when the bus is granted. If the condition of block 735 proves false, then the process continues to decision block 740 where if the value of the RxUsed register 67 is greater than or equal to the difference in the value of the UpTgtBurst register 64 and the UpEstLatency register 62, then the bus 22 is requested at block 745 and data is moved in accordance with block 750 when the bus is granted. Finally, if the condition of block 740 proves false then the process returns to block 715 where data continues to be received by the receive buffer 25 from the network, and the process repeats itself continuously to determine when to optimally make receive (upload) bus requests in accordance with the present invention.

Although illustrative embodiments of the invention have been described in detail herein with reference to the accompanying drawings, it is to be understood that the invention is not limited to those precise embodiments. They are not intended to be exhaustive or to limit the invention to the precise forms disclosed. As such, many modifications and variations will be apparent to practitioners skilled in this art. Accordingly, it is intended that the scope of the invention be defined by the following claims and their equivalents.

What is claimed is:

1. In a communication system, a method for transferring data between a host computer and a network medium coupled to the host computer, wherein the host computer includes an expansion bus and a network adapter device coupled to the expansion bus and to the network medium, the method comprising the steps of:
    transferring data between a buffer memory in the network adapter and the network medium;
    generating a first buffer data signal in response to the amount of data present in the buffer memory;
    generating a second buffer data signal in response to previous transfers of data between the host computer and the network medium, wherein the second buffer data signal represents the amount of data in the buffer at the time when the expansion bus should be requested by the network adapter device to optimize a data transfer between the network adapter and the host computer;
    asserting a bus request signal to the host computer in response to the first and second buffer data signals; and
    transferring data between the host computer and the buffer memory over the expansion bus.

2. The method of transferring data between a host computer and a network medium of claim 1 wherein asserting the bus request signal further comprises the steps of:
    providing the first and second buffer data signals to a dynamic bus request control logic;
    comparing the first buffer data signal with the second buffer data signal; and
    generating the bus request signal when the value of the first buffer data signal satisfies a logic relation to the value of the second buffer data signal.

3. The method of transferring data between a host computer and a network medium of claim 1 further comprising the steps of:
    providing a priority threshold signal; and
    asserting the bus request signal when the value of the first buffer data signal satisfies a logic relation to the priority threshold signal.

4. The method of transferring data between a host computer and a network medium of claim 3 wherein the priority threshold signal comprises a signal generated in response to previous transfers of data between the host computer and the network medium.

5. The method of transferring data between a host computer and a network medium of claim 3 wherein the priority threshold signal comprises a signal generated in response to hardware capabilities of the host computer.

6. The method of transferring data between a host computer and a network medium of claim 3 wherein the priority threshold signal comprises a signal generated in response to numbers of at least one of overruns and underruns.

7. The method of transferring data between a host computer and a network medium of claim 1 wherein generating the second buffer data signal is responsive to the size of data bursts transferred between the host computer and the buffer memory.

8. The method of transferring data between a host computer and a network medium of claim 7 wherein generating the second buffer data signal further comprises the steps of:
monitoring the size of each data burst transferred between the host computer and the buffer memory; and
updating the value of the second buffer data signal such that the second buffer data signal comprises a value representative of the size of the maximum sized data burst transferred between the host computer and the buffer memory since the host computer was powered on.

9. The method of transferring data between a host computer and a network medium of claim 7 wherein generating the second buffer data signal further comprises the steps of:
monitoring the size of each data burst transferred between the host computer and the buffer memory; and
updating the value of the second buffer data signal such that the second buffer data signal comprises a value representative of the size of previous bursts based on a statistical function.

10. The method of transferring data between a host computer and a network medium of claim 8 further comprising the steps of:
providing a priority threshold signal; and
asserting the bus request signal when the value of the first buffer data signal satisfies a logic relation to the priority threshold signal.

11. The method of transferring data between a host computer and a network medium of claim 10 wherein the priority threshold signal comprises a signal generated in response to previous transfers of data between the host computer and the network medium.

12. The method of transferring data between a host computer and a network medium of claim 10 wherein the priority threshold signal comprises a signal generated in response to hardware capabilities of the host computer.

13. The method of transferring data between a host computer and a network medium of claim 10 wherein the priority threshold signal comprises a signal generated in response to numbers of at least one of overruns and underruns.

14. The method of transferring data between a host computer and a network medium of claim 8 wherein asserting the bus request signal further comprises the steps of:
providing the first and second buffer data signals to a dynamic bus request control logic;
comparing the first buffer data signal with the second buffer data signal; and
generating the bus request signal when the value of the first buffer data signal satisfies a logic relation to the value of the second buffer data signal.

15. The method of transferring data between a host computer and a network medium of claim 7 wherein the buffer memory comprises a memory that is smaller than the maximum size data packet utilized in the communication system.

16. The method of transferring data between a host computer and a network medium of claim 1 wherein generating the second buffer data signal is responsive to an estimated latency signal.

17. The method of transferring data between a host computer and a network medium of claim 16 wherein the second buffer data signal comprises the difference of the estimated latency signal and an optimal burst length signal wherein the optimal burst length signal represents the length of a piece of data which will optimize an individual data transfer between the host computer and the buffer memory.

18. The method of transferring data between a host computer and a network medium of claim 17 wherein the estimated latency signal comprises an estimate of the amount of data transfer that would occur between the host computer and the buffer memory during a time period comprising the latency time determined by a function of one or more previous data transfers between the host computer and the buffer memory.

19. The method of claim 18, wherein said function comprises equality to a latency time of a previous transfer.

20. The method of claim 18, wherein said function comprises an average latency time of a plurality of previous transfers.

21. The method of claim 18, wherein said function comprises a function of latency times of a plurality of previous transfers which have a particular characteristic.

22. The method of transferring data between a host computer and a network medium of claim 18 wherein generating the optimal burst length signal further comprises the steps of:
monitoring the size of each data burst transferred between the host computer and the buffer memory; and
updating the value of the optimal burst length signal such that the optimal burst length signal comprises a value representative of the size of the maximum sized data burst transferred between the host computer and the buffer memory since the host computer was powered on.

23. The method of transferring data between a host computer and a network medium of claim 22 further comprising the steps of:
providing a priority threshold signal; and
asserting the bus request signal when the value of the first buffer data signal is one of greater than and less than the priority threshold signal.

24. The method of transferring data between a host computer and a network medium of claim 23 wherein the priority threshold signal comprises a signal generated in response to previous transfers of data between the host computer and the network medium.

25. The method of transferring data between a host computer and a network medium of claim 23 wherein the priority threshold signal comprises a signal generated in response to hardware capabilities of the host computer.

26. The method of transferring data between a host computer and a network medium of claim 23 wherein the priority threshold signal comprises a signal generated in response to numbers of at least one of overruns and underruns.

27. The method of transferring data between a host computer and a network medium of claim 22 wherein asserting the bus request signal further comprises the steps of:
providing the first and second buffer data signals to a dynamic bus request control logic;

comparing the first buffer data signal with the second buffer data signal; and generating the bus request signal when the value of the first buffer data signal is one of greater than and less than the value of the second buffer data signal.

28. The method of transferring data between a host computer and a network medium of claim 16 wherein the buffer memory comprises a memory that is smaller than the maximum size data packet utilized in the communication system.

29. In a communication system, a network adapter apparatus for controlling a transfer of data between a host computer and a network medium coupled to the host computer, wherein the host computer includes an expansion bus, the apparatus comprising:

a buffer memory that transfers data between the host computer and the network medium;

a buffer control logic that generates a first buffer data signal in response to the amount of data in the buffer memory;

a bus control logic that generates a second buffer data signal in response to previous transfers of data between the host computer and the network medium; and a dynamic bus request logic that asserts a bus request signal at a time responsive to the first and second buffer data signals to initiate an optimized data transfer between the host computer and the buffer memory during a contemporaneous transfer of data between the buffer memory and the network medium.

30. The apparatus for controlling a transfer of data between a host computer and a network medium of claim 29 wherein the dynamic bus request logic asserts the bus request signal when the value of the first buffer data signal satisfies a logic relation to the value of the second buffer data signal.

31. The apparatus for controlling a transfer of data between a host computer and a network medium of claim 29 wherein the bus control logic further comprises a priority logic that provides a priority threshold signal to the dynamic bus request logic such that the dynamic bus request logic asserts the bus request signal when the value of the first buffer data signal satisfies a logic relation to the priority threshold signal.

32. The apparatus for controlling a transfer of data between a host computer and a network medium of claim 31 wherein the priority threshold signal comprises a signal generated in response to previous transfers of data between the host computer and the network medium.

33. The apparatus for controlling a transfer of data between a host computer and a network medium of claim 31 wherein the priority threshold signal comprises a signal generated in response to hardware capabilities of the host computer.

34. The apparatus for controlling a transfer of data between a host computer and a network medium of claim 31 wherein the priority threshold signal comprises a signal generated in response to numbers of at least one of overruns and underruns.

35. The apparatus for controlling a transfer of data between a host computer and a network medium of claim 29 wherein the bus control logic further comprises a target burst logic that generates the second buffer data signal in response to the size of data bursts transferred between the host computer and the buffer memory.

36. The apparatus for controlling a transfer of data between a host computer and a network medium of claim 35 wherein the target burst logic comprises:

monitor logic that monitors the size of each data packet transferred between the host computer and the buffer memory; and a first compare logic that updates the value of the second buffer data signal such that the second buffer data signal comprises a value representative of the size of the maximum sized data packet transferred between the host computer and the buffer memory since the host computer was powered on.

37. The apparatus for controlling a transfer of data between a host computer and a network medium of claim 35 wherein the target burst logic comprises:

monitor logic that monitors the size of each data packet transferred between the host computer and the buffer memory; and a first compare logic that updates the value of the second buffer data signal such that the second buffer data signal comprises a value representative of the size of previous bursts based on a statistical function.

38. The apparatus for controlling a transfer of data between a host computer and a network medium of claim 36 wherein the bus control logic further comprises a priority logic that provides a priority threshold signal to the dynamic bus request logic such that the dynamic bus request logic asserts the bus request signal when the value of the first buffer data signal is one of greater than and less than the priority threshold signal.

39. The apparatus for controlling a transfer of data between a host computer and a network medium of claim 38 wherein the priority threshold signal comprises a signal generated in response to previous transfers of data between the host computer and the network medium.

40. The apparatus for controlling a transfer of data between a host computer and a network medium of claim 38 wherein the priority threshold signal comprises a signal generated in response to hardware capabilities of the host computer.

41. The apparatus for controlling a transfer of data between a host computer and a network medium of claim 38 wherein the priority threshold signal comprises a signal generated in response to numbers of at least one of overruns and underruns.

42. The apparatus for controlling a transfer of data between a host computer and a network medium of claim 36 wherein the dynamic bus request logic asserts the bus request signal when the value of the first buffer data signal is one of greater than and less than the value of the second buffer data signal.

43. The apparatus for controlling a transfer of data between a host computer and a network medium of claim 35 wherein the buffer memory comprises a memory that is smaller than the maximum size data packet utilized in the communication system.

44. The apparatus for controlling a transfer of data between a host computer and a network medium of claim 29 wherein the bus control logic further comprises a latency logic that generates an estimated latency signal and wherein the second buffer data signal is responsive to the estimated latency signal.

45. The apparatus for controlling a transfer of data between a host computer and a network medium of claim 44 wherein the bus control logic further comprises a target burst logic that generates an optimal burst length signal representative of the length of a piece of data which will optimize an individual data transfer between the host computer and the buffer memory.

46. The apparatus for controlling a transfer of data between a host computer and a network medium of claim 45 wherein the second buffer data signal comprises the difference of the estimated latency signal and the optimal burst length signal.

47. The apparatus for controlling a transfer of data between a host computer and a network medium of claim 46 wherein the estimated latency signal comprises an estimate of the amount of data transfer that would occur between the host computer and the buffer memory during a time period comprising the latency time of the previous data transfer between the host computer and the buffer memory.

48. The apparatus for controlling a transfer of data between a host computer and a network medium of claim 47 wherein the target burst logic comprises:
   monitor logic that monitors the size of each data burst transferred between the host computer and the buffer memory; and
   a first compare logic that updates the value of the optimal burst length signal such that the optimal burst length signal comprises a value representative of the size of the maximum sized data burst transferred between the host computer and the buffer memory since the host computer was powered on.

49. The apparatus for controlling a transfer of data between a host computer and a network medium of claim 47 wherein the target burst logic comprises:
   monitor logic that monitors the size of each data burst transferred between the host computer and the buffer memory; and
   a first compare logic that updates the value of the optimal burst length signal such that the optimal burst length signal comprises a value representative of the size of previous bursts based on a statistical function.

50. The apparatus for controlling a transfer of data between a host computer and a network medium of claim 48 wherein the bus control logic further comprises a priority logic that provides a priority threshold signal to the dynamic bus request logic such that the dynamic bus request logic asserts the bus request signal when the value of the first buffer data signal satisfies a logic relation to the priority threshold signal.

51. The apparatus for controlling a transfer of data between a host computer and a network medium of claim 50 wherein the priority threshold signal comprises a signal generated in response to previous transfers of data between the host computer and the network medium.

52. The apparatus for controlling a transfer of data between a host computer and a network medium of claim 50 wherein the priority threshold signal comprises a signal generated in response to hardware capabilities of the host computer.

53. The apparatus for controlling a transfer of data between a host computer and a network medium of claim 50 wherein the priority threshold signal comprises a signal generated in response to numbers of at least one of overruns and underruns.

54. The apparatus for controlling a transfer of data between a host computer and a network medium of claim 48 wherein the dynamic bus request logic asserts the bus request signal when the value of the first buffer data signal satisfies a logic relation to the value of the second buffer data signal.

55. The apparatus for controlling a transfer of data between a host computer and a network medium of claim 44 wherein the buffer memory comprises a memory that is smaller than the maximum size data packet utilized in the communication system.

56. In a communication system, a network adapter apparatus for controlling a transfer of data between a host computer and a network medium coupled to the host computer, wherein the host computer includes an expansion bus, the apparatus comprising:
   a buffer memory that transfers data between the host computer and the network medium;
   a buffer control logic that generates a first buffer data signal in response to the amount of data in the buffer memory;
   a bus control logic that generates a second buffer data signal comprising the difference of an estimated latency signal and an optimal burst length signal, the bus control further comprising;
      latency logic that generates the estimated latency signal wherein the estimated latency signal comprises an estimate of the amount of data transfer that would occur between the host computer and the buffer memory during a time period comprising the latency time of the previous data transfer between the host computer and the buffer memory; and
      target burst logic that generates the optimal burst length signal such that the optimal burst length signal comprises a value representative of the length of a piece of data which will optimize an individual data transfer between the host computer and the buffer memory; and
   a dynamic bus request logic that asserts a bus request signal at a time responsive to the first and second buffer data signals to initiate an optimized data transfer between the host computer and the buffer memory during a contemporaneous transfer of data between the buffer memory and the network medium.

57. The apparatus for controlling a transfer of data between a host computer and a network medium of claim 56 wherein the target burst logic comprises:
   monitor logic that monitors the size of each data burst transferred between the host computer and the buffer memory; and
   a first compare logic that updates the value of the optimal burst length signal such that the optimal burst length signal comprises a value representative of the size of the maximum sized data packet transferred between the host computer and the buffer memory since the host computer was powered on.

58. The apparatus for controlling a transfer of data between a host computer and a network medium of claim 56 wherein the target burst logic comprises:
   monitor logic that monitors the size of each data burst transferred between the host computer and the buffer memory; and
   a first compare logic that updates the value of the optimal burst length signal such that the optimal burst length signal comprises a value representative of the size of previous bursts based on a statistical function.

59. The apparatus for controlling a transfer of data between a host computer and a network medium of claim 57 wherein the bus control logic further comprises a priority logic that provides a priority threshold signal to the dynamic bus request logic such that the dynamic bus request logic asserts the bus request signal when the value of the first buffer data signal satisfies a logic relation to the priority threshold signal.

60. The apparatus for controlling a transfer of data between a host computer and a network medium of claim 59 wherein the priority threshold signal comprises a signal generated in response to previous transfers of data between the host computer and the network medium.

61. The apparatus for controlling a transfer of data between a host computer and a network medium of claim 59 wherein the priority threshold signal comprises a signal generated in response to hardware capabilities of the host computer.

62. The apparatus for controlling a transfer of data between a host computer and a network medium of claim 59 wherein the priority threshold signal comprises a signal generated in response to numbers of at least one of overruns and underruns.

63. The apparatus for controlling a transfer of data between a host computer and a network medium of claim 57 wherein the dynamic bus request logic asserts the bus request signal when the value of the first buffer data signal satisfies a logic relation to the value of the second buffer data signal.

64. The apparatus for controlling a transfer of data between a host computer and a network medium of claim 56 wherein the buffer memory comprises a memory that is smaller than the maximum size data packet utilized in the communication system.

65. In a communication system, a network adapter apparatus for controlling a transfer of data between a host computer and a network medium coupled to the host computer, wherein the host computer includes an expansion bus, the apparatus comprising:
   a means for transferring data between a buffer memory in the network adapter apparatus and the network medium;
   a means for generating a first buffer data signal in response to the amount of data present in the buffer memory;
   a means for generating a second buffer data signal in response to previous transfers of data between the host computer and the network medium, wherein the second buffer data signal represents the amount of data in the buffer at the time when the expansion bus should be requested by the network adapter device to optimize a data transfer between the network adapter and the host computer;
   a means for asserting a bus request signal to the host computer in response to the first and second buffer data signals; and
   a means for transferring data between the host computer and the buffer memory over the expansion bus.

66. The apparatus for controlling a transfer of data between a host computer and a network medium of claim 65 wherein the means for asserting the bus request signal comprises:
   a means for comparing the first buffer data signal with the second buffer data signal; and
   a means for generating the bus request signal when the value of the first buffer data signal satisfies a logic relation to the value of the second buffer data signal.

67. The apparatus for controlling a transfer of data between a host computer and a network medium of claim 65 further comprising:
   a means for providing a priority threshold signal; and
   a means for asserting the bus request signal when the value of the first buffer data signal satisfies a logic relation to the priority threshold signal.

68. The apparatus for controlling a transfer of data between a host computer and a network medium of claim 67 wherein the priority threshold signal comprises a signal generated in response to previous transfers of data between the host computer and the network medium.

69. The apparatus for controlling a transfer of data between a host computer and a network medium of claim 67 wherein the priority threshold signal comprises a signal generated in response to hardware capabilities of the host computer.

70. The apparatus for controlling a transfer of data between a host computer and a network medium of claim 67 wherein the priority threshold signal comprises a signal generated in response to numbers of at least one of overruns and underruns.

71. The apparatus for controlling a transfer of data between a host computer and a network medium of claim 65 wherein the means for generating the second buffer data signal is responsive to the size of data bursts transferred between the host computer and the buffer memory.

72. The apparatus for controlling a transfer of data between a host computer and a network medium of claim 71 wherein the means for generating the second buffer data signal comprises:
   a means for monitoring the size of each data burst transferred between the host computer and the buffer memory; and
   a means for updating the value of the second buffer data signal such that the second buffer data signal comprises a value representative of the size of the maximum sized data burst transferred between the host computer and the buffer memory since the host computer was powered on.

73. The apparatus for controlling a transfer of data between a host computer and a network medium of claim 71 wherein the means for generating the second buffer data signal comprises:
   a means for monitoring the size of each data burst transferred between the host computer and the buffer memory; and
   a means for updating the value of the second buffer data signal such that the second buffer data signal comprises a value representative of the size of previous bursts based on a statistical function.

74. The apparatus for controlling a transfer of data between a host computer and a network medium of claim 72 further comprising:
   a means for providing a priority threshold signal; and
   a means for asserting the bus request signal when the value of the first buffer data signal is one of greater than and less than the priority threshold signal.

75. The apparatus for controlling a transfer of data between a host computer and a network medium of claim 74 wherein the priority threshold signal comprises a signal generated in response to previous transfers of data between the host computer and the network medium.

76. The apparatus for controlling a transfer of data between a host computer and a network medium of claim 74 wherein the priority threshold signal comprises a signal generated in response to hardware capabilities of the host computer.

77. The apparatus for controlling a transfer of data between a host computer and a network medium of claim 74 wherein the priority threshold signal comprises a signal generated in response to numbers of at least one of overruns and underruns.

78. The apparatus for controlling a transfer of data between a host computer and a network medium of claim 72 wherein the means for asserting the bus request signal comprises:
   a means for comparing the first buffer data signal with the second buffer data signal; and a means for generating the bus request signal when the value of the first buffer data signal is one of greater than and less than the value of the second buffer data signal.

79. The apparatus for controlling a transfer of data between a host computer and a network medium of claim 71 wherein the buffer memory comprises a memory that is smaller than the maximum size data packet utilized in the communication system.

80. The apparatus for controlling a transfer of data between a host computer and a network medium of claim 65 wherein the means for generating the second buffer data signal is responsive to an estimated latency signal generated by a latency estimation means.

81. The apparatus for controlling a transfer of data between a host computer and a network medium of claim 80 wherein the second buffer data signal comprises the difference of the estimated latency signal and an optimal burst length signal generated by an optimal burst length means wherein the optimal burst length signal represents the length of a piece of data which will optimize an individual data transfer between the host computer and the buffer memory.

82. The apparatus for controlling a transfer of data between a host computer and a network medium of claim 81 wherein the estimated latency signal comprises an estimate of the amount of data transfer that would occur between the host computer and the buffer memory during a time period comprising the latency time of the previous data transfer between the host computer and the buffer memory.

83. The apparatus for controlling a transfer of data between a host computer and a network medium of claim 82 wherein the optimal burst length means comprises:

a means for monitoring the size of each data burst transferred between the host computer and the buffer memory; and a means for updating the value of the optimal burst length signal such that the optimal burst length signal comprises a value representative of the size of the maximum sized data burst transferred between the host computer and the buffer memory since the host computer was powered on.

84. The apparatus for controlling a transfer of data between a host computer and a network medium of claim 82 wherein the optimal burst length means comprises:

a means for monitoring the size of each data burst transferred between the host computer and the buffer memory; and a means for updating the value of the optimal burst length signal such that the optimal burst length signal comprises a value representative of the size of previous bursts based on a statistical function.

85. The apparatus for controlling a transfer of data between a host computer and a network medium of claim 83 further comprising:

a means for providing a priority threshold signal; and a means for asserting the bus request signal when the value of the first buffer data signal satisfies a logic relation to the priority threshold signal.

86. The method of transferring data between a host computer and a network medium of claim 85 wherein the priority threshold signal comprises a signal generated in response to previous transfers of data between the host computer and the network medium.

87. The method of transferring data between a host computer and a network medium of claim 85 wherein the priority threshold signal comprises a signal generated in response to hardware capabilities of the host computer.

88. The method of transferring data between a host computer and a network medium of claim 85 wherein the priority threshold signal comprises a signal generated in response to numbers of at least one of overruns and underruns.

89. The apparatus for controlling a transfer of data between a host computer and a network medium of claim 83 wherein the means for asserting the bus request signal comprises:

a means for comparing the first buffer data signal with the second buffer data signal; and a means for generating the bus request signal when the value of the first buffer data signal satisfies a logic relation to the value of the second buffer data signal.

90. The apparatus for controlling a transfer of data between a host computer and a network medium of claim 80 wherein the buffer memory comprises a memory that is smaller than the maximum size data packet utilized in the communication system.

* * * * *